US012099613B2

(12) United States Patent
Yang et al.

(10) Patent No.: US 12,099,613 B2
(45) Date of Patent: Sep. 24, 2024

(54) MODIFICATION OF A DOCKERFILE TO REPAIR VULNERABILITIES EXISTING IN THE DOCKERFILE

(71) Applicant: INTERNATIONAL BUSINESS MACHINES CORPORATION, Armonk, NY (US)

(72) Inventors: Xiang Yu Yang, Xi'an (CN); Yong Wang, Xi'an (CN); Zhong Fang Yuan, Xi'an (CN); Deng Xin Luo, Xi'an (CN); Ye Wang, Xi'An (CN); Zhi Yong Jia, Xi'An (CN)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 17/476,579

(22) Filed: Sep. 16, 2021

(65) Prior Publication Data

US 2023/0083195 A1 Mar. 16, 2023

(51) Int. Cl.
*G06F 21/57* (2013.01)
*G06F 8/61* (2018.01)
(Continued)

(52) U.S. Cl.
CPC .............. *G06F 21/577* (2013.01); *G06F 8/63* (2013.01); *G06F 16/1873* (2019.01); *G06F 16/2246* (2019.01); *G06F 2221/033* (2013.01)

(58) Field of Classification Search
CPC ...... G06F 21/577; G06F 8/63; G06F 16/1873; G06F 16/2246; G06F 2221/033; G06F 8/71; H04L 63/1433
See application file for complete search history.

(56) References Cited

U.S. PATENT DOCUMENTS 10,656,929 B2 5/2020 Jamjoom
2013/0347116 A1* 12/2013 Flores ................. H04L 63/1433
726/25
(Continued)

FOREIGN PATENT DOCUMENTS

CN 106469083 A 3/2017
CN 109062655 A 12/2018
(Continued)

OTHER PUBLICATIONS

Takeshi et al. "Implementation and evaluation of an intrusion-resilient system for a DNS service," Oct. 2017, pp. 1735-1749. (Year: 2017).*

(Continued)

*Primary Examiner* — Luu T Pham
*Assistant Examiner* — Canh Le
(74) *Attorney, Agent, or Firm* — Schmeiser, Olsen & Watts, LLP; Edward Wixted

(57) ABSTRACT

A method, computer program product, and computer system for repairing a Dockerfile. Library versions containing initial version numbers of libraries are extracted from the Dockerfile. A Monte Carlo tree search (MCTS) is executed, using the extracted library versions as input, which generates a tree that includes multiple levels populated with noses. Each node in a level represents the generic library name of a library version in the Dockrerfile and an associated randomly selected version number. At least one of the randomly selected version numbers associated with at least one node in a level differs from the initial version number associated with a versionf. A best successful installation path is selected from the at least one successful installation path. The Dockerfile is repaired by inserting randomly selected version numbers into Dockerfile as replacements for some of the initial version numbers.

19 Claims, 15 Drawing Sheets

(51) Int. Cl.
*G06F 16/18* (2019.01)
*G06F 16/22* (2019.01)

(56) References Cited

U.S. PATENT DOCUMENTS

| | | | |
|---|---|---|---|
| 2017/0223147 A1* | 8/2017 | Wang | H04L 9/40 |
| 2019/0114157 A1* | 4/2019 | Makkar | G06F 8/72 |
| 2019/0312800 A1* | 10/2019 | Schibler | H04L 41/0869 |
| 2020/0412769 A1 | 12/2020 | Yi | |

FOREIGN PATENT DOCUMENTS

| | | |
|---|---|---|
| CN | 109918911 B | 6/2019 |
| CN | 112084496 A | 12/2020 |
| CN | 112162761 A | 1/2021 |

OTHER PUBLICATIONS

Ana Duarte et al., "An Empirical Study of Docker Vulnerabilities and of Static Code Analysis Applicability" 2018, pp. 27-36. (Year: 2018).*

Mell, Peter et al.; "The NIST Definition of Cloud Computing;" National Institute of Standards and Technology; Special Publication 800-145; Sep. 2011; 7 pages.

* cited by examiner

MODIFICATION OF A DOCKERFILE TO REPAIR VULNERABILITIES EXISTING IN THE DOCKERFILE

BACKGROUND

Embodiments of the present invention relate generally to repair of a Dockerfile. More particularly, embodiments of the present invention utilize a stochastic mechanism to repair a Dockerfile.

SUMMARY

Embodiments of the present invention provide a method, a computer program product and a computer system, for repairing a Dockerfile.

One or more processors of a computer system, extract L library versions denoted as $X_1, X_2, \ldots, X_L$. Rach library version comprises a generic library name and an associated initial version number. The L library versions appear in a sequential order in the Dockerfile. L is at least 2.

The one or more processors execute, using the extracted L library versions as input, a Monte Carlo tree search (MCTS) of a tree. Executing the MCTS includes generating the tree comprising L+1 levels denoted as levels 0, 1, 2, ..., and L, where level 0 comprises a root node not associated with any generic library name of the L generic library names, where each level of levels 1, 2, ..., L comprises a plurality of nodes, where each node in level I is a child node of a node in level I-1 (I=1, 2, ..., and L), where each node in level L is a leaf node, where each node in level I represents the generic library name of the library version $X_I$ and an associated randomly selected version number (I=1, 2, ..., and L), where at least one of the randomly selected version numbers associated with at least one node in level I differs from the initial version number associated with version $X_I$ in the Dockerfile (I=1, 2, ..., and L), where executing the MCTS comprises performing K successful simulations of respective leaf nodes in level L which defines K respective successful installation paths of nodes in the tree from the leaf node to each respective leaf node, and where K is at least 1.

The one or more processors select a best successful installation path from the K successful installation paths.

The one or more processors repair the Dockerfile, where repairing the Dockerfile comprises extracting each randomly selected version number of each node in the best successful installation path and inserting, in the Dockerfile, each extracted randomly selected version number as a replacement, in the Docker file, of respective initial version numbers corresponding to the generic library names that each node in the best successful installation path represents.

DETAILED DESCRIPTION

Figure 1:
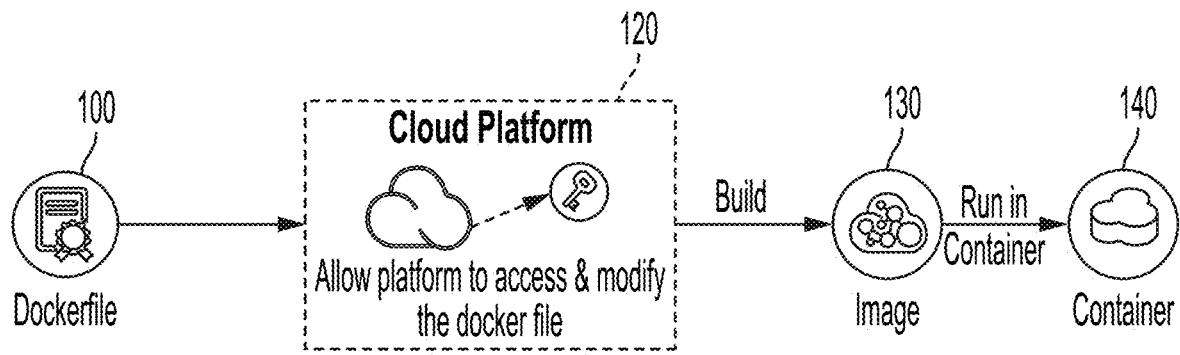
FIG. 1 depicts access to, modification of, and use of, by a cloud platform, a Dockerfile to build an image that is executed to create and launch a container, in accordance with embodiments of the present invention.

Major manufacturers have created their own cloud platforms and many projects rely on cloud platform operation and maintenance. Strong computing and storage capacity, security, automatic rapid deployment and other advantages provided by a cloud platform are particularly beneficial. For example, for project deployment, a cirrus cloud platform provides a variety of deployment methods, such as dockerfile, S2i, etc.

Dockerfile is a mainstream deployment mode and a pipeline binds the source code or image to a cirrus registry. After the completion of the image construction, for security reasons, the cloud platform will automatically scan the image to check whether there is a disclosed vulnerability exposure (CVE) in the image. If there is a high level vulnerability risk identified in the scan of the image, developers may need to modify the Dockerfile manually and deploy the Dockerfile again to build an image. In the process of building the image using the Dockerfile, if the version of a dependent library is too low or incorrect, an error will be reported in the compilation process, and the Dockerfile needs to be modified and the modified Dockerfile re-deployed to build the image.

Therefore, a needed rapid automatic deployment based on cloud platform may face the process of manual intervention and debugging for many times in the initial stage. If there are many applications corresponding to different images, it will take a lot of time and effort to change the Dockerfile, and it may take a lot of time and effort to identify vulnerabilities in the Dockerfile and to re-deploy the Dockerfile again.

Embodiments of the present invention provide: (i) security detection of vulnerabilities in a Dockerfile deployed in a cloud platform and repair of the vulnerabilities; (ii) with permission of the user, risk detection and simulation detection and repair with respect to a Dockerfile are carried out by constructing a clone image simulation real environment; (iii) a stochastic mechanism such as a Monte Carlo search tree (MCTS) to provide, via an automated vulnerability scanning and results analysis process, repair suggestions for possible risk dependent packages in the Dockerfile; (iv) automatic tracing errors in the build image process and providing the version or name of dependency libraries available in the Dockerfile; and (v) automatic access of the Dockerfile of the cloud platform and provision for modification suggestions for the Dockerfile.

Embodiments of the present invention provide a functionality on a cloud platform for a user to choose whether or not to allow the cloud platform to access and modify the user's Dockerfiles. A switch may be defined in the cloud platform to control, by the user, whether the cloud platform is allowed to carry out security detection and virtual simulation repair for the Dockerfile and the image construction process.

Embodiments of the present invention provide, according to the image scanning results, a trace of vulnerable code so as to know a risk dependence of the Dockerfile to enable repair the known risk through simulation in the virtual clone environment.

If the user agrees to using the cloud platform for security detection, the cloud platform will build a virtual clone image based on the image with current security risk and run the virtual clone image in a test environment. In a process of construction and operation, the cloud platform will combine the build logs and scanned image report to find the libraries to be fixed. The build logs are used to extract the key information such as "out of date", "XXX will be removed" and "cancelled", etc. in the build log according to the error log or container running log of image construction, and the corresponding dependency package and associated version may thus be found. Using risk libraries identified in scanned image reports, the virtual environment of the cloud platform will link to the Common Vulnerabilities and Exposures (CVE) platform and the publishing website of the common environment component dependent package. From analysis of the virtual image, security risks are detected and the cloud platform will obtain the risk libraries' name and version.

When the cloud platform obtains the risk libraries combining the build logs and scan image reports, the cloud platform will check the version and package information through the Monte Carlo search algorithm for performing the MCTS based on the existing resources to find the library version that can avoid the risks.

During the detection process, the cloud platform will automatically modify the Dockerfile of the clone image in the virtual environment to verify whether the selected version has no relevant security risks. If the risk can't be avoided or the container still can't run normally, the Dockerfile will be handled by manual treatment. If the cloud platform can avoid vulnerability risk or repair the image or container problems through virtual simulation, the cloud platform will provide users with a risk warning and simulation repair result suggestions in the cloud platform, and prompt users to decide whether to agree to apply the simulation repair results to the original image. If users agree and accept the platform repair suggestions, the repair scheme will be automatically applied to the original image, and users will be informed that the repair is has a completed status, while retaining the pre-fix version snapshot of the Dockerfile or image for users to backtrack or reproduce the problem.

FIG. 1 depicts access to, modification of, and use of, by a cloud platform 120, a Dockerfile 110 to build an image 130 that is executed to create and launch a container 140, in accordance with embodiments of the present invention. In one embodiment, the user elects whether or not to allow the cloud platform 120 to access and modify the Dockerfile 110.

Figure 2:
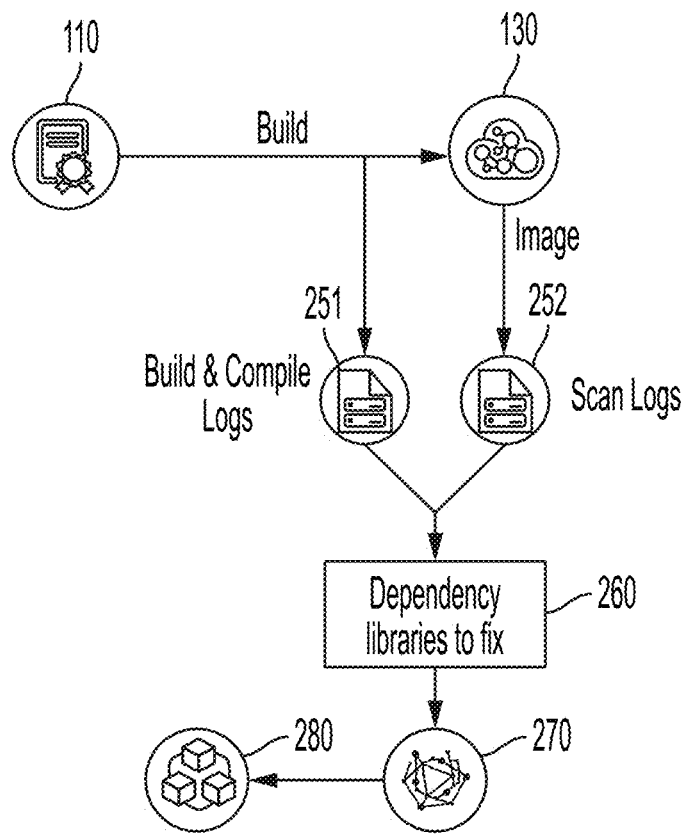
FIG. 2 depicts a system for repairing the Dockerfile via use of build logs, scanned image logs, and a Monte Carlo tree search (MCTS), in accordance with embodiments of the present invention.

FIG. 2 depicts a system for repairing the Dockerfile 110 via use of build logs 251, scanned image logs 252, and a Monte Carlo tree search (MCTS) 270, in accordance with embodiments of the present invention.

If there is any error during the build process, the build process will be stopped, and the cloud platform will send a notification of the error to a developer who can check the build logs 251 to find the cause of the error in the build. The build may have failed from one or more libraries specified in the Dockerfile.

Vulnerabilities in the Dockerfile 110 are searched from analysis of scanned image logs 252. The scanned logs are generated after the image has been built using the Dockerfile. If any vulnerable libraries are found in the scanned image, a scanning tool that scanned the image will generate a report of the scanning result. If there is any vulnerability from the libraries, the developer must replace the libraries manually.

Dependencies 260 between libraries in the Dockerfile 110 are used by the MCTS 270 to identify successful versions of the libraries for use by the Dockerfile 110. After the MCTS has completed, the successful libraries found in the MCTS 270 are used in a repair step 280 to repair the Dockerfile 110 which is then ready to be used again to build an image 120.

Figure 3:
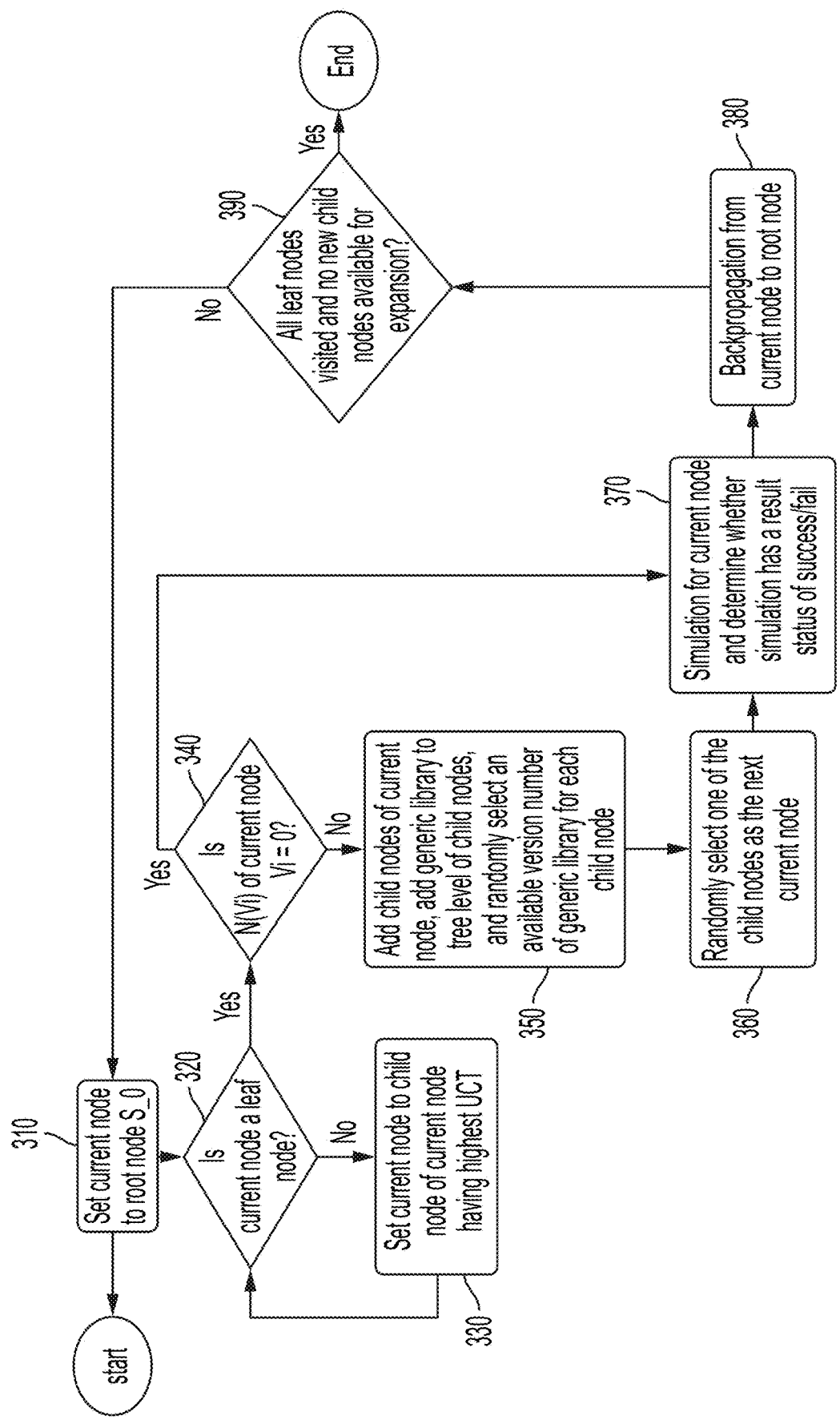
FIG. 3 is a flow chart of a method that implements the Monte Carlo tree search of a tree that is generated dynamically as the MCTS progresses through successive iterations of an iterative process, in accordance with embodiments of the present invention.

FIG. 3 is a flow chart of a method that implements the Monte Carlo tree search 270 of a tree that is generated dynamically as the MCTS progresses through successive iterations of an iterative process, in accordance with embodiments of the present invention. In one embodiment the method of FIG. 3 is implemented in a virtual clone environment. The MCTS 270 comprises an iterative process in which new child nodes may be generated at each iteration. The flow chart of FIG. 3 includes steps 310-390.

Next, the flow chart of FIG. 3 is described, after which the flow chart of FIG. 3 will be further explained infra through use of an exemplary Dockerfile depicted in Table 1 and use of an illustrative example that implements the MCTS.

The method of FIG. 3 includes calculation and use of a function UCT which is defined as follows in Equation (1).

$$UCT(Vi, V) = \frac{Q(Vi)}{N(Vi)} + C\sqrt{\frac{\ln(N(V))}{N(Vi)}} \quad (1)$$

UCT stands for Upper Confidence bound applied to Trees.

The UCT function returns a value used to select a node from one or more nodes having a same parent node when traversing the tree. The node that is selected from the one or more nodes having the same parent node is the node having the highest MCT value. If two or more nodes having the same parent node have a same highest value of UCT, then the node is randomly selected from the two or more nodes having the same parent node, subject to each node having an equal probability of being selected.

The notation appearing in Equation (1) are defined as follows.

Q(Vi) is defined as a parameter having a value for each node Vi that is initialized to zero and is incremented by 1 whenever the node Vi is in a path in which a backpropagation has occurred in step 380 following a successful simulation occurring in step 370. Thus, Q(Vi) is dynamically generated as the MCTS progresses through successive iterations.

Q(V) is defined as a parameter having a value for root node S_0 (i.e., V=S_0) that is initialized to zero and is incremented by 1 whenever the root node is in a path in which a backpropagation has occurred in step 380 following a successful simulation occurring in step 370. Thus, Q(V) is dynamically generated as the MCTS progresses through successive iterations.

N(Vi) is defined as a parameter having a value for each node Vi that is initialized to zero and is incremented by 1 whenever the node Vi is in a path in which a backpropagation has occurred in step 380. Thus, N(Vi) is dynamically generated as the MCTS progresses through successive iterations.

N(V) is defined as a parameter having value for the root node S_0 (i.e., V=S_0) that is initialized to zero and is incremented by 1 whenever the root node S_0 is in a path in which a backpropagation has occurred in step 380. Thus, N(V) is dynamically generated as the MCTS progress through successive iterations.

C is a specified constant who value may depend on previous experience in implementing the MCTS. In one embodiment, C may be specified by the user or encoded into software that implements the MCTS. In one embodiment, C is equal to 2. If performance of the MCTS does not result in rebuilding the Dockerfile successfully, the user may change C and repeat the MCTS with the changed C in an attempt to improve the MCTS result such that the Dockerfile is successfully built as a result of the changed C.

UCT provides a mechanism to select the node as the tree is traversed in each iteration, subject to selecting the node which has the highest UCT value. Use of UCT provides a balance between using historical generation of Q(Vi), N(Vi) and N(V) of previously generated nodes and exploring a new node with fewer visitations as reflected in Q(Vi) and N(Vi) of the new node.

The MCTS includes steps of Selection, Expansion, Rollout, and Backpropagation.

The Selection step 330 selects a best node in each iteration based on the UCT function.

The Expansion step 350 expands a node to add extra child nodes into the tree, to go deeper into the tree to find more detail regarding library versions, which generates additional child layers until the MTCS ends.

The Simulation step 370 determines whether a selected node having the highest UTS succeeds or fails (i.e., has a result status of "SUCCESS" or "FAIL") in a simulation that will be described infra.

The Backpropagation step 380 updates Q(Vi), N(Vi), Q(V) and N(V) at each node in a nodal path from the current node to the root node S_0.

Step 310 sets the current node to a root node S_0. The first execution of step 310 in iteration 1 initiates generation of the tree and has no associated library. In iteration 1, step 310 also performs an expansion step of adding M child nodes to the tree from the current node (i.e., from the root node S_0), where M is a positive integer of at least 2 (e.g., M=2, 3, 4, 5, etc.), which is similar to the expansion step 350. The addition of M child nodes under S_0 ensures that the node S_0 is not both a root node and a leaf node.

Step 320 determines whether the current node is a leaf node.

If step 320 determines that the current node is not a leaf node (No branch from step 310), then step 330 selects a child node of the current node having the highest value of UCT as the next current node, and the process loops back to step 320. If more than one child nodes have a same highest value of UCT, then the next current node is randomly selected from the more than one child nodes, subject to each child node having an equal probability of being randomly selected.

If step 320 determines that the current node is a leaf node (Yes branch from step 320), then step 340 is next executed.

Step 340 determines whether N(Vi) of current node Vi is equal to zero.

If step 340 determines that N(Vi) of current node Vi is not equal to zero (No branch from step 340), then step 350 is next executed.

If step 340 determines that N(Vi) of current node Vi is equal to zero (Yes branch from step 340), then step 370 is next executed.

Step 350 adds M child nodes to the tree from the current node, where M is a positive integer of at least 2 (e.g., M=2, 3, 4, 5, etc.).

In one embodiment, M is a specified constant for the entire tree for all iterations of the MCTS.

In one embodiment, M is a specified constant that is constant for the entire tree but is specific to the iteration (e.g., M=2, 3, 4, . . . for iteration 1, 2, 3, . . . , respectively)

Figure 12:
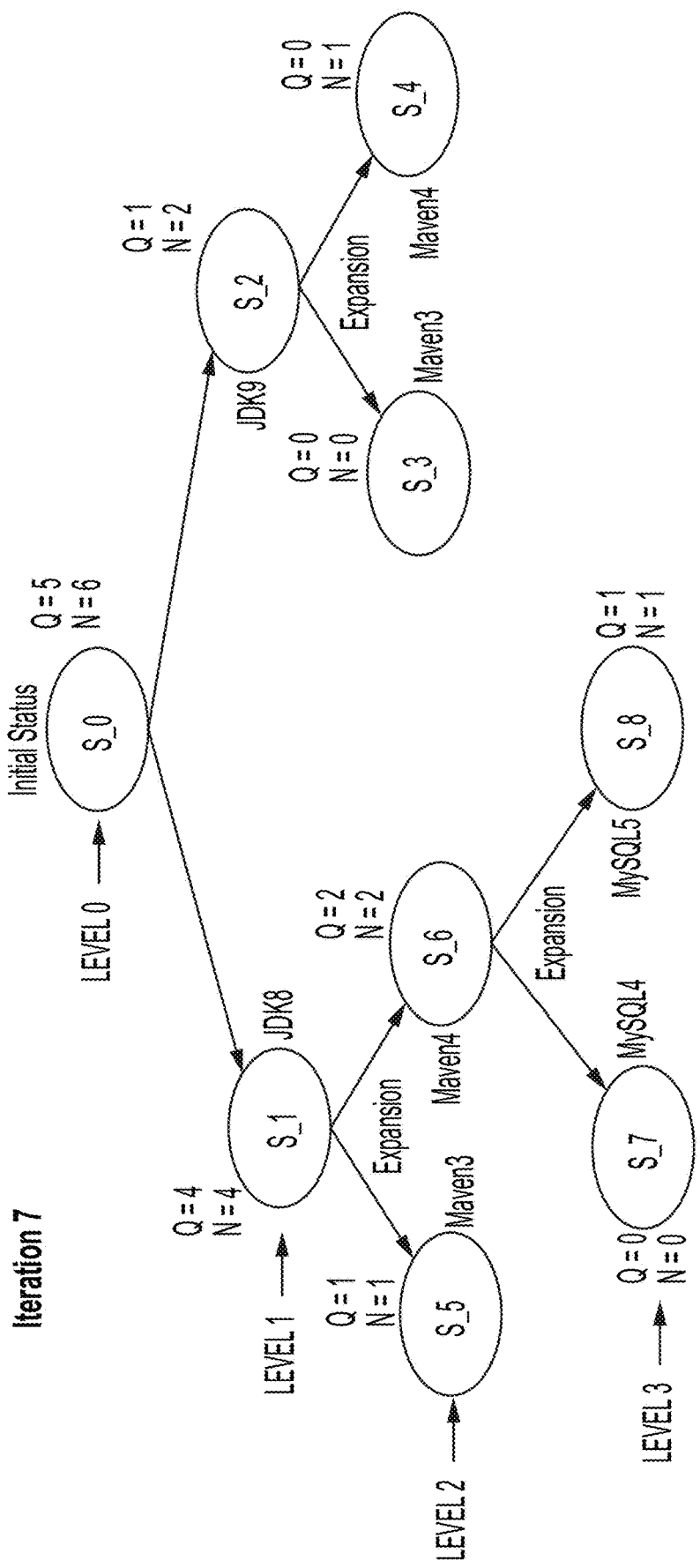

In one embodiment, M is a specified constant that is independent of the iteration number but is specific to the tree level of the added M child nodes (e.g., M=3, 2, 3, . . . for tree level 1, 2, 3, . . . , respectively) for all iterations, where the root node S_0 is at level 0. The tree levels 0, 1, 2 and 3 are depicted in FIG. 12.

Step 350 also associates a generic library (e.g., JDK) with the tree level of the added child nodes. The generic library is selected based on a sequential appearance of the associated generic library in the Dockerfile as illustrated infra in a discussion of the Dockerfile in Table 1. Before the MCTS is initiated, the libraries that need to be installed in the image can be identified from the Dockerfile.

Step 350 also randomly selects an available version number of the associated generic library independently for each child node of the M child nodes. Each available version number has an equal probability of being selected. Before the MCTS is initiated, the available versions of the generic library can be obtained from an open library hub or from an official website of the generic library.

Step 360 randomly selects one node of the M child nodes added in step 350 as the next current node. Each child node of the M child nodes has an equal probability of being randomly selected.

Figure 4:
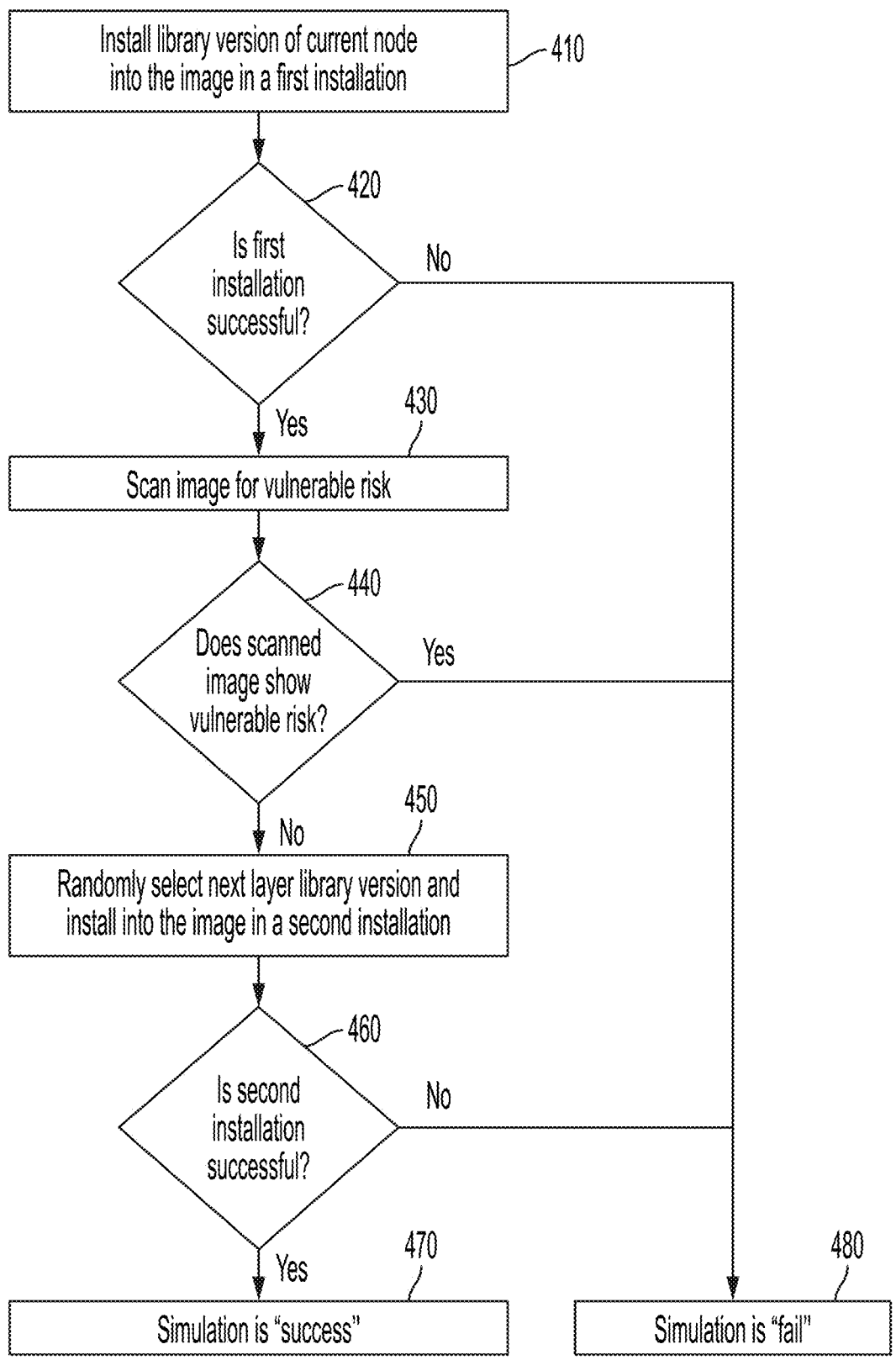
FIG. 4 determines a result status of "SUCCESS" or "FAIL" for a simulation performed in a simulation step in FIG. 3, in accordance with embodiments of the present invention.

Step 370 performs a simulation for the current node and determines whether the simulation has a result status of "SUCCESS" or "FAIL" in accordance with a success/fail determination process described in FIG. 4. If the simulation has a result status of "FAIL" for the current node, the failed current node is not removed from the tree and the failed node's library is likewise not removed. It is statistically possible to revisit the failed node in subsequent steps of the MCTS. However, if the library of the same current node failed many times, the UCT value will be smaller and smaller, and the probability to select the failed node becomes smaller and smaller. Although the probability is becoming smaller in successive iteration, the MCTS may again select the node subsequently, since a small probability is not a zero probability.

Step 380 backpropagates along a path from the current node to the root node S_0. The path includes nodes traversed during the current iteration. The backpropagation increments N(Vi) and N(V) by 1 for each node visited along the path in the current iteration. If the simulation in step 370 is "SUCCESS", the backpropagation increments Q(Vi) and Q(V) by 1 for each node visited along the path in the current iteration.

Step 390 determines whether all leaf nodes have been visited and no new child nodes are available for expansion.

If step 390 that all leaf nodes have been visited and no new child nodes are available for expansion (Yes branch from step 380), then the MCTS ends. Otherwise (No branch from step 390), the process loops back to step 310 to perform a next iteration of the MCTS.

FIG. 4 determines a result status of "SUCCESS" or "FAIL" for the simulation performed in the simulation step 370 of FIG. 3, in accordance with embodiments of the present invention. The flow chart of FIG. 4 includes steps 410-480.

Step 410 installs the library version of the current node into the image in a first installation.

Step 420 determines, from the build log or image status, whether the first installation is successful.

If step 420 determines that the first installation is not successful (No branch from step 420), then step 480 is next executed.

If step 420 determines that the first installation is successful (Yes branch from step 420), then step 430 is next executed.

Step 430 scans the image for vulnerable risk.

Step 440 determines whether the scanned image shows vulnerable risk.

If step 440 determines that the scanned image shows vulnerable risk (Yes branch from step 440), then step 480 is next executed.

If step 440 determines that the scanned image does not show vulnerable risk (No branch from step 440), then step 450 is next executed.

Step 450 randomly selects a next layer library version from available next layer library versions and installs the next layer library version into the image in a second installation. Each available next layer library version has an equal probability of being randomly selected.

Step 460 determines, from the build log or image status, whether the second installation is successful.

If step 460 determines that the second installation is not successful (No branch from step 450), then step 480 is next executed.

If step 460 determines that the second installation is successful (Yes branch from step 450), then step 470 is next executed.

Step 470 determines that result status for the simulation is "SUCCESS".

Step 480 determines that result status for the simulation is "FAIL".

Figure 5:
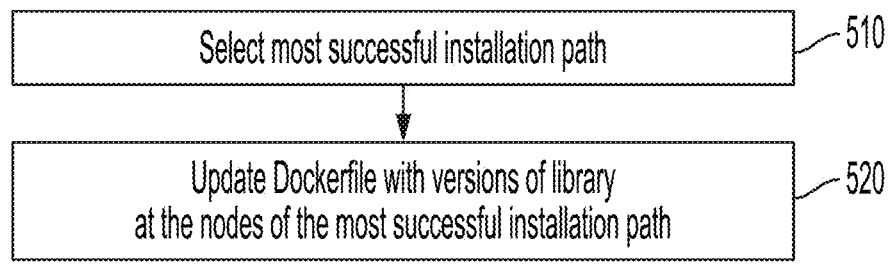
FIG. 5 is a flow chart describing modification of the Dockerfile after the MCTS ends, in accordance with embodiments of the present invention.

FIG. 5 is a flow chart describing modification of the Dockerfile after the MCTS ends, in accordance with embodiments of the present invention. In one embodiment, the flow chart of FIG. 5 implements the Dockerfile repair step 280 in FIG. 2. The flow chart of FIG. 5 includes steps 510-520.

Step 510 extracts a best successful installation path determined by the MCTS by extracting K successful installation paths determined by the MCTS, wherein K is at least 1. Each successful installation path is a path traversed during execution of the MCTS and starts at the root node S_0 and ends at a leaf node existing at the end of the MCTS, wherein a simulation performed during the MCTS in step 370 of FIG. 3 for the leaf node has a result status of "SUCCESS".

If the extracted K successful installation paths consist of a single successful installation path (i.e., K=1), then the single successful installation path is selected to be the best successful installation path.

If the extracted K successful installation paths encompass two or more successful installation paths (i.e., K≥2), then the best successful installation path is selected from the two or more successful installation paths by having the highest summation of UCT values over the nodes of the successful installation path. If at least two successful installation paths of the two or more successful installation paths have a same highest summation of UCT values over the nodes of the successful installation path, then the best successful installation path is randomly selected from the at least two successful installation paths, with each successful installation path of the at least two successful installation paths having an equal probability of being randomly selected.

Step 520 updates the Dockerfile with the versions of the libraries at the nodes of the best successful installation path selected in step 510.

There are many lines of text in sequence from top to the bottom of the Dockerfile. Each line of text is one command, which in one embodiment each one command may be a Linux or Windows terminal command. When the Dockerfile is used to build an image, the commands will be executed, line by line from the first line on the top of the Dockerfile to the last line at the end of the Dockerfile. In these lines, some commands are configured to run software, some commands are basic commands such as, inter alia, making a directory, copying files, etc., and some commands install libraries in the image. Before the MCTS is executed, the libraries to be installed in the Dockerfile can be extracted and stored in a list of libraries sequenced in order of appearance in the Dockerfile. All the available libraries in different versions may be obtained from the libraries' official website or from other library hubs, to expand the list of libraries. Then the MCTS will use the expanded list of libraries to perform the search and simulation in the sequence of libraries appearing in the list of libraries. Thus, when MCTS simulates a path from the top node (S_0) to the leaf node having the last library and all of the simulation have a result status of "SUCCESS", the MCTS process will finish. Accordingly, the number of libraries to be installed in the Dockerfile is limited, because when the MCTS expands child nodes to include the last library in the Dockerfile (or in the list of libraries), the MCTS process finishes Table 1 is an exemplary Dockerfile for building an image.

TABLE 1

| Exemplary Dockerfile |
| --- |
| FROM ubuntu: 18.1<br>RUN apt-get install library_A=1.2<br>RUN mkdir dir_1<br>COPY ./file1 /usr/local/file1<br>RUN apt-get install library_B=5.5<br>RUN apt-get install library_C=3.7<br>COPY ./file2 /usr/bin/file2<br>RUN chown root:root /usr/bin/file2 |

The Dockerfile in Table 1 is building a ubuntu image. During the build process, the Dockerfile line is processed by line, and the command in each line is executed in the following sequence 1-8.

1. Pull the base image from docker hub; the base image names ubuntu and the version is 18.1
2. Run the command 'apt-get install library A=1.2', to install library_A, version 1.2.
3. Run the command 'mkdir dir_1' to make a directory named dir_1.
4. Copy the local file named file1 to the image, and the destination path is "/usr/local/file1".
5. Install library_B, version 5.5.
6. Install library_C, version 3.7.
7. Copy the local file named file2 to the image; destination path is "/usr/bin".
8. Change the file owner as root:root.

After all of the preceding commands 1-8 have run without any errors, the image is built. If there are one or more errors during the image building process, the image building process will be stopped, and the cloud platform will send a notification of the one or more errors to a developer of the Dockerfile. The developer can check the build logs to find reason(s) for the one or more errors. A reasons may be that the build failed due to incompatible libraries that caused a failure of installation during the building process.

After building the image successfully, the cloud platform has a functionality to scan the image, checking if there are any vulnerable libraries in the image, and generating a report of the scanning result using the scanning tool. If there is any vulnerability from the libraries, the developer should replace the libraries manually Thus, embodiments of the present invention help the developer to solve the installation problem during the building process.

One embodiment extracts all the libraries to be installed in the Dockerfile, namely library_A, library_B and library_C, which can be stored in the following list of libraries: [library_A, library_B and library_C] in sequence. Then, all of the available versions of these three libraries (A, B, C) may be obtained from public sources, official websites, or other open library hubs.

Then, the list of libraries can be expanded as follows to include library version numbers:

```
[
  [library_A_1.1, library_A_1.2, library_A_1.4, library_A_2.0],
  [library_B_5.3, library_B_5.5, library_B_6.0, library_B_7.1],
  [library_C_2.7, library_C_3.6, library_C_3.7, library_C_3.8]
]
```

The generic libraries (A, B, C) placed in the tree levels generated during the MCTS have a same sequencing as the sequencing of libraries A, B, C in the Dockerfile.

In one embodiment, the preceding processing of the Dockefile may be performed in a virtual clone environment.

For each simulation, a temporary dockerfile is generated and used to build the image. For example, when the simulation is performed for the Dockfile in Table 1, the temporary dockerfile is depicted in Table 2 in which the library_B version has been changed from 5.5 to 5.6.

TABLE 2

Temporary Dockerfile

FROM ubuntu: 18.1
RUN apt-get install library_A=1.2
RUN mkdir dir_1
COPY ./file1 /usr/local/file1
RUN apt-get install library_B=5.6

If this temporary Dockerfile is built successfully, the next lines will be inserted in the temporary Dockerfile until the installation line during the next simulation process.

FIGS. 6-12 depict implementation of the MCTS method described in FIG. 3 as applied to an illustrative example, in accordance with embodiments of the present invention. FIGS. 6-12 pertain to iterations 1-7 of the MCTS, respectively. Execution of each iteration of the MCTS for this example involves implementing the MCTS logic in the flow chart of FIG. 3 with respect to steps 310-390.

FIGS. 6-12 do not include a completion of the MCTS for this example. In particular, FIG. 12 depicts the initial status in iteration 7, and more iterations need to be performed beyond iteration 7 in order to satisfy the exit criteria of step 390. However, the first six iterations depicted in FIGS. 6-11 illustrate essentially all of the logic for executing the MCTS encompassed by the flow chart of FIG. 3, with the exception of ending the MCTS via the Yes branch from step 390.

In this example, the generic libraries sequenced in the associated Dockerfile are JDK, Maven, and MySQL and are thus associated with child nodes generated in tree levels 1, 2 and 3 respectively as successive iterations of the MCTS are performed, where the root node S_0 is at level 0. Thus, level 3 is the deepest level of the tree in this example.

In this example, in all instances of generating child nodes from a parent node, exactly two child nodes are generated, even though embodiments of the invention allow the number of generated child nodes (M) generated from a parent node to be any positive integer of at least 2.

In FIGS. 6-12, values of Q and N are shown for each node, wherein Q stands for Q(V) if the node is the root node S_0 and stands for Q(Vi) if the node is not the root node S_0, and wherein N stands for N(V) if the node is the root node S_0 and stands for N(Vi) if the node is not the root node S_0. The parameters Q(V), Q(Vi), N(V) and N(Vi) appear in Equation (1). The parameter C in Equation (1) has a constant value of 2.

Figure 6:
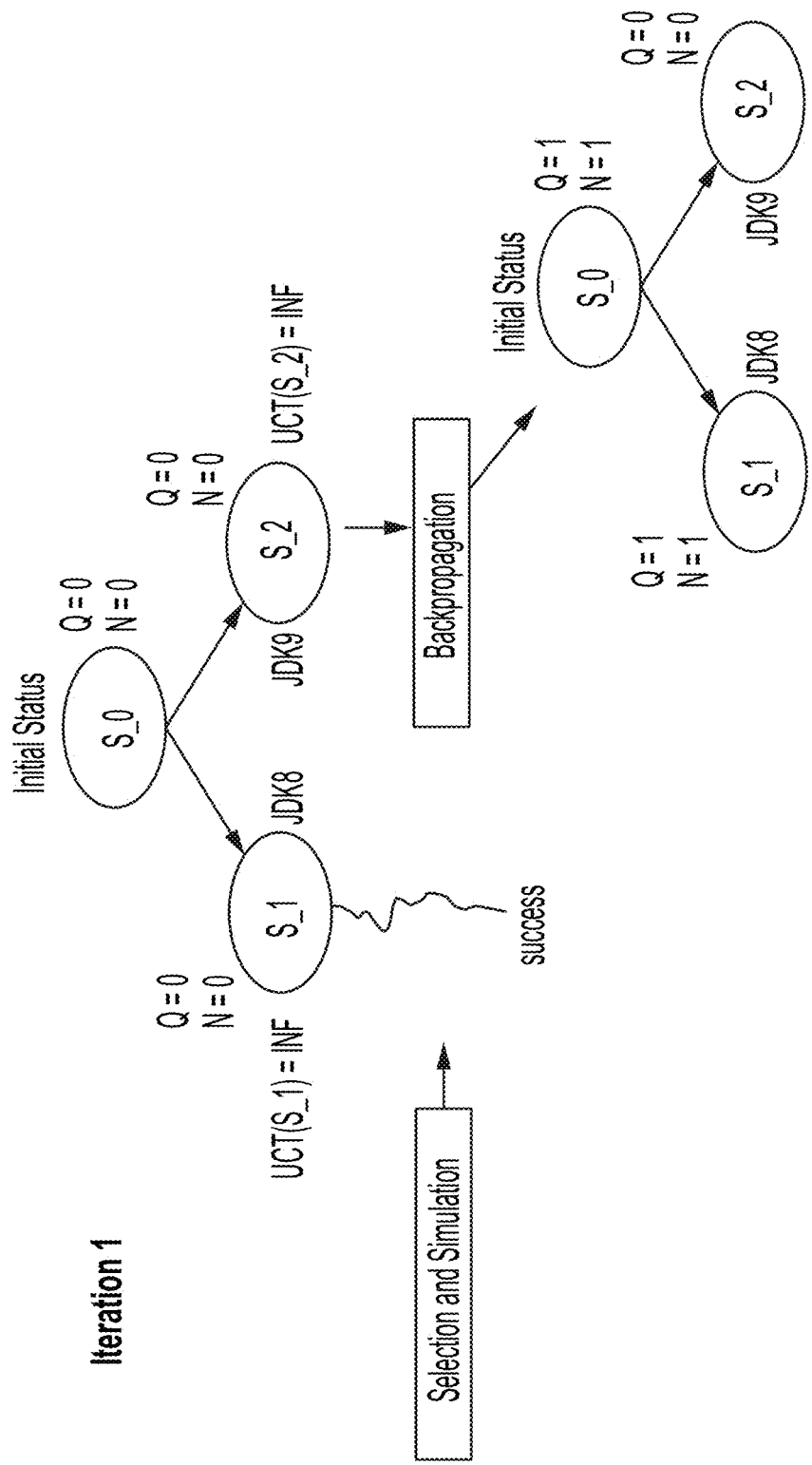
FIGS. 6-12 depict implementation of the MCTS method described in FIG. 3 as applied to an illustrative example, in accordance with embodiments of the present invention.

FIG. 6 depicts performance of iteration 1 of the MCTS in which step 310 sets the root node S_0 as the current node and generates child nodes S_1 and S_2. The root node S_0 is at level o of the tree. Nodes S_1 and S_2 are in level 1 of the tree and the generic library JDK is accordingly assigned to level 1. Library versions JDK8 and JDK 9 are randomly selected for nodes S_1 and S_2, respectively, with all JDK library versions that can be randomly selected having equal probability of being randomly selected. Since current node S_0 is not a leaf node and UCT is infinite for both nodes S_1 and S_2, step 330 randomly selects node S_1 as the new current node. Since current node S_1 is a leaf node and N=0 for current node S_1, a simulation for node S_1 is performed in step 370 with a result status of "SUCCESS". Then the backpropagation step 380 updates Q and N in the visited path S_1, S_0 by incrementing N by 1 (since nodes S_1 and S_0 were visited in iteration 1) and incrementing Q by 1 (since the result status was "SUCCESS" in the simulation for node S_1 in iteration 1).

Figure 7:
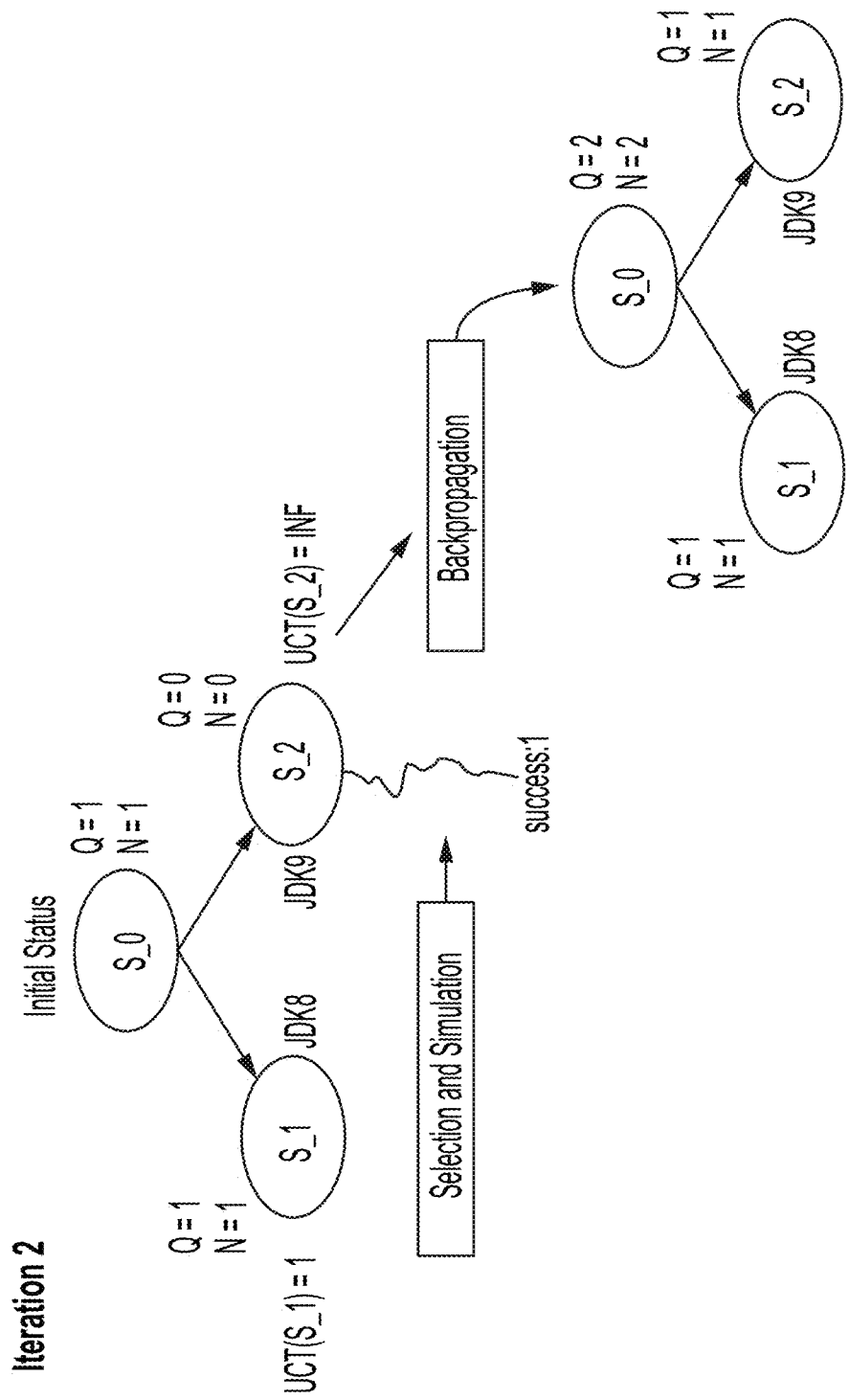

FIG. 7 depicts performance of iteration 2 of the MCTS. The initial status of the nodes at the start of iteration 2 includes the values of Q and N resulting from the backpropagation step performed at the end iteration 1. Iteration 2 starts with root node S_0 as the current node. Since current node S_0 is not a leaf node, step 330 selects node S_2 as the next current node because UCT (infinity) for node S_2 exceeds UCT (1.0) for node S_1. Since current node S_2 is a leaf node and since N=0 for current node S_2, a simulation for node S_2 is performed in step 370 with a result status of "SUCCESS". Then the backpropagation step 380 updates Q and N in the visited path S_2, S_0 by incrementing N by 1 (since nodes S_2 and S_0 were visited in iteration 2) and incrementing Q by 1 (since the result status was "SUCCESS" in the simulation for node S_2 in iteration 2).

Figure 8:
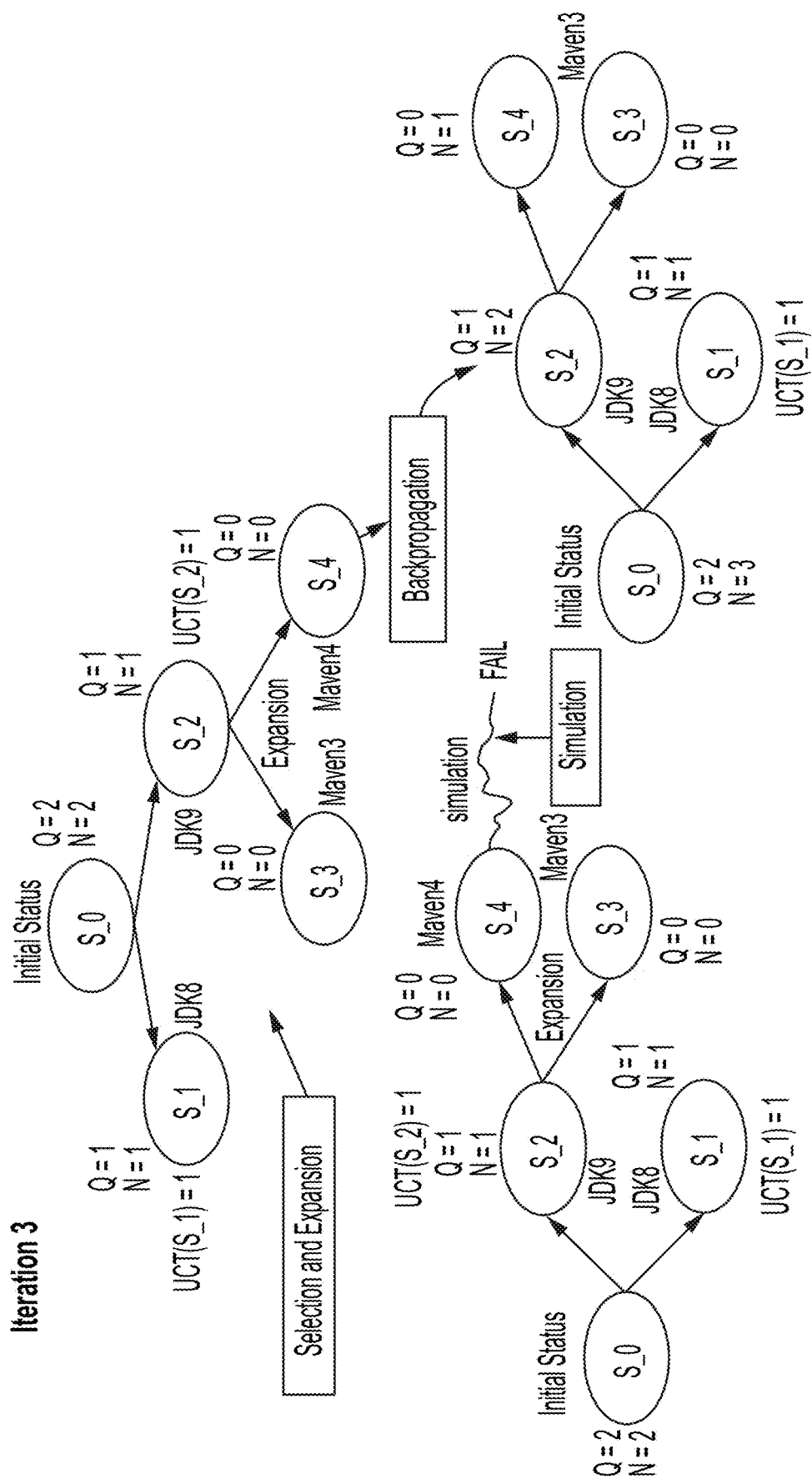

FIG. 8 depicts performance of iteration 3 of the MCTS. The initial status of the nodes at the start of iteration 3 includes the values of Q and N resulting from the backpropagation step performed at the end iteration 2. Iteration 3 starts with root node S_0 as the current node. Since node S_0 is not a leaf node and since UCT=1 for both nodes S_1 and S_2, step 330 randomly selects node S_2 as the next current node. Since current node S_2 is a leaf node and since N≠0 for current node S_2, new level 2 child nodes S_3 and S_4 are generated in expansion step 350 with generic library Maven assigned to level 2 and library versions Maven3 and Maven 4 randomly selected for nodes S_3 and S_4, respectively, with all Maven library versions that can be randomly selected having equal probability of being randomly selected. Step 360 randomly selects node S_4 as the new current node. Then, step 370 performs a simulation for current node S_4 with a result status of "FAIL". Then the backpropagation step 380 updates Q and N in the visited path S_4, S_2, S_0 by incrementing N by 1 (since nodes S_4, S_2 and S_0 were visited in iteration 3) and Q is not changed (since the result status was "FAIL" in the simulation for node S_4 in iteration 3).

Figure 9:
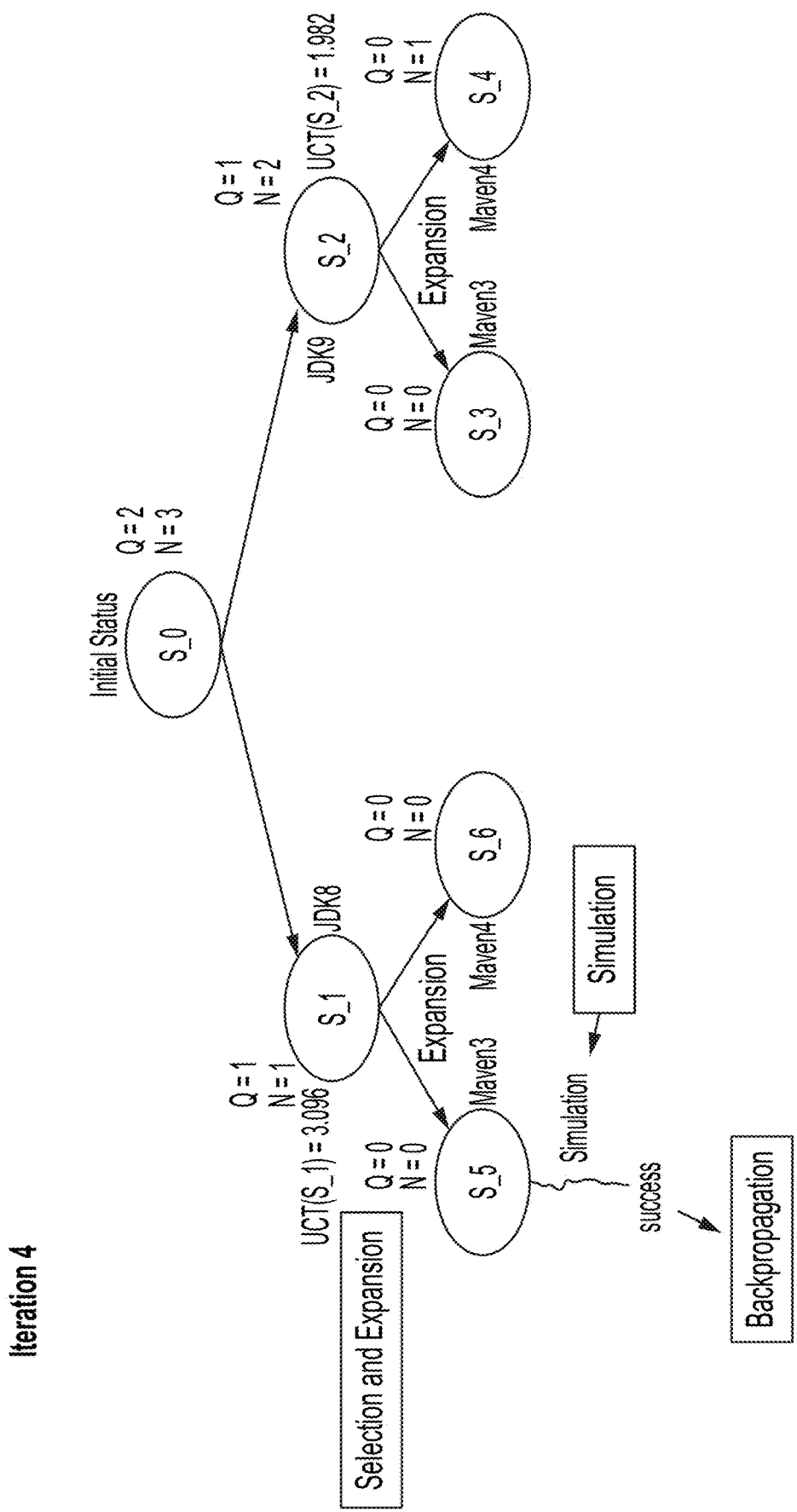

FIG. 9 depicts performance of iteration 4 of the MCTS. The initial status of the nodes at the start of iteration 4 includes the values of Q and N resulting from the backpropagation step performed at the end iteration 3. Iteration 4 starts with root node S_0 as the current node. Since node S_0 is not a leaf node, step 330 selects node S_1 as the next current node because UCT (3.096) for node S_1 exceeds UCT (1.982) for node S_2. Since current node S_1 is a leaf node and since N≠0 for current node S_1, new level 2 child nodes S_5 and S_6 are generated in expansion step 350 with library versions Maven3 and Maven4 randomly selected for nodes S_5 and S_6, respectively. Then step 360 randomly selects node S_5 as the next current node. Then step 370 performs a simulation for current node S_5 with a result status of "SUCCESS". Then the backpropagation step 380 updates Q and N in the visited path S_5, S_1, S_0 by incrementing N by 1 (since nodes S_5, S_1 and S_0 were visited in iteration 4) and incrementing Q by 1 (since the result status was "SUCCESS" in the simulation for node S_5 in iteration 4). The result of the backpropagation in iteration 4 is not shown in FIG. 9 but is shown in the initial status of iteration 5 in FIG. 10.

Figure 10:
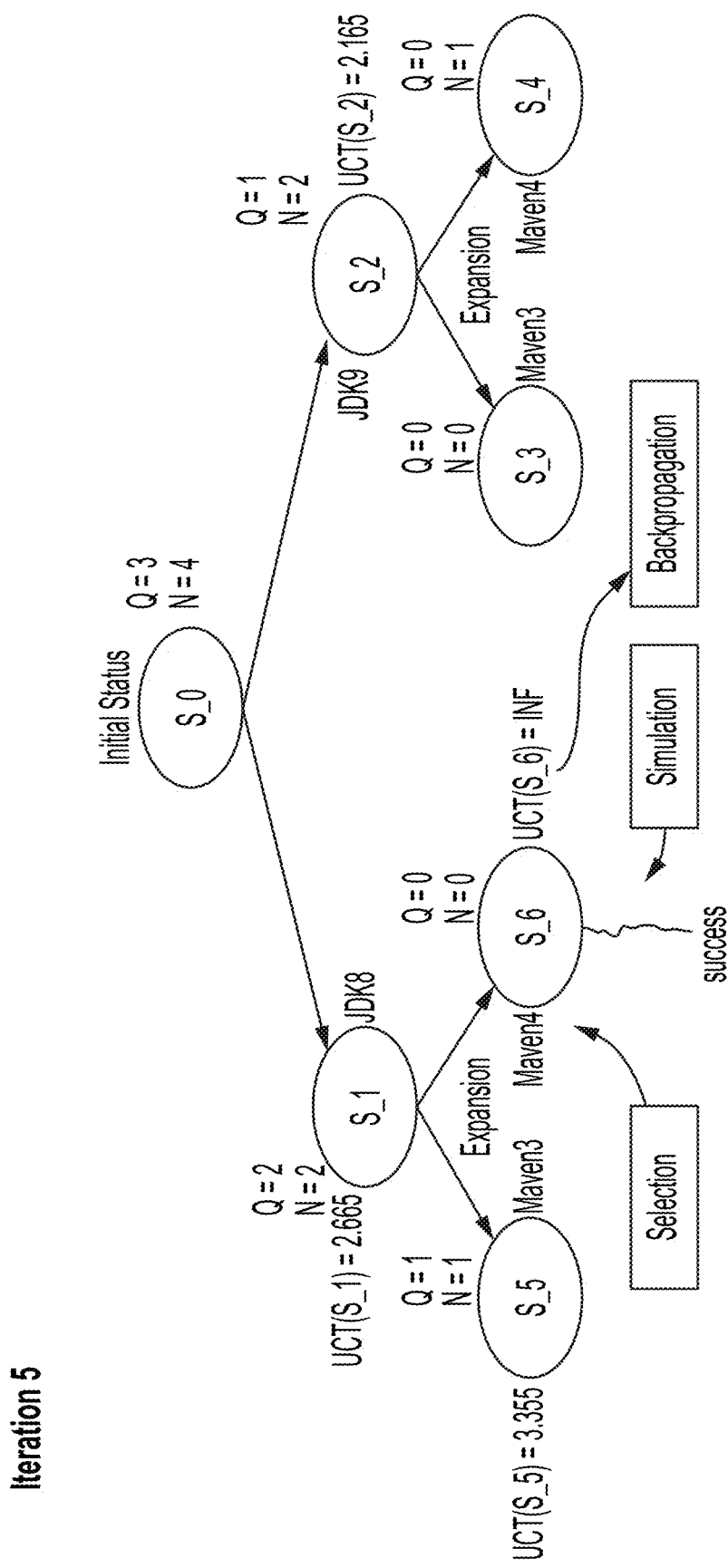

FIG. 10 depicts performance of iteration 5 of the MCTS. The initial status of the nodes at the start of iteration 5 includes the values of Q and N resulting from the backpropagation step performed at the end iteration 4. Since node S_0 is not a leaf node, step 330 selects node S_1 as the next current node because UCT (2.665) for node S_1 exceeds UCT (2.165) for node S_2. Since current node S_1 is not a leaf node, step 330 selects node S_6 as the next current node because UCT (infinity) for node S_6 exceeds UCT (3.355) for node S_5. Since current node S_6 is a leaf node and since N=0 for node S_6, step 370 performs a simulation for current node S_6 with a result status of "SUCCESS". Then the backpropagation step 380 updates Q and N in the visited path S_6, S_1, S_0 by incrementing N by 1 (since nodes S_6, S_1 and S_0 were visited in iteration 5) and incrementing Q by 1 (since the result status was "SUCCESS" in the simulation for node S_6 in iteration 5). The result of the backpropagation in iteration 5 is not shown in FIG. 10 but is shown in the initial status of iteration 6 in FIG. 11.

Figure 11:
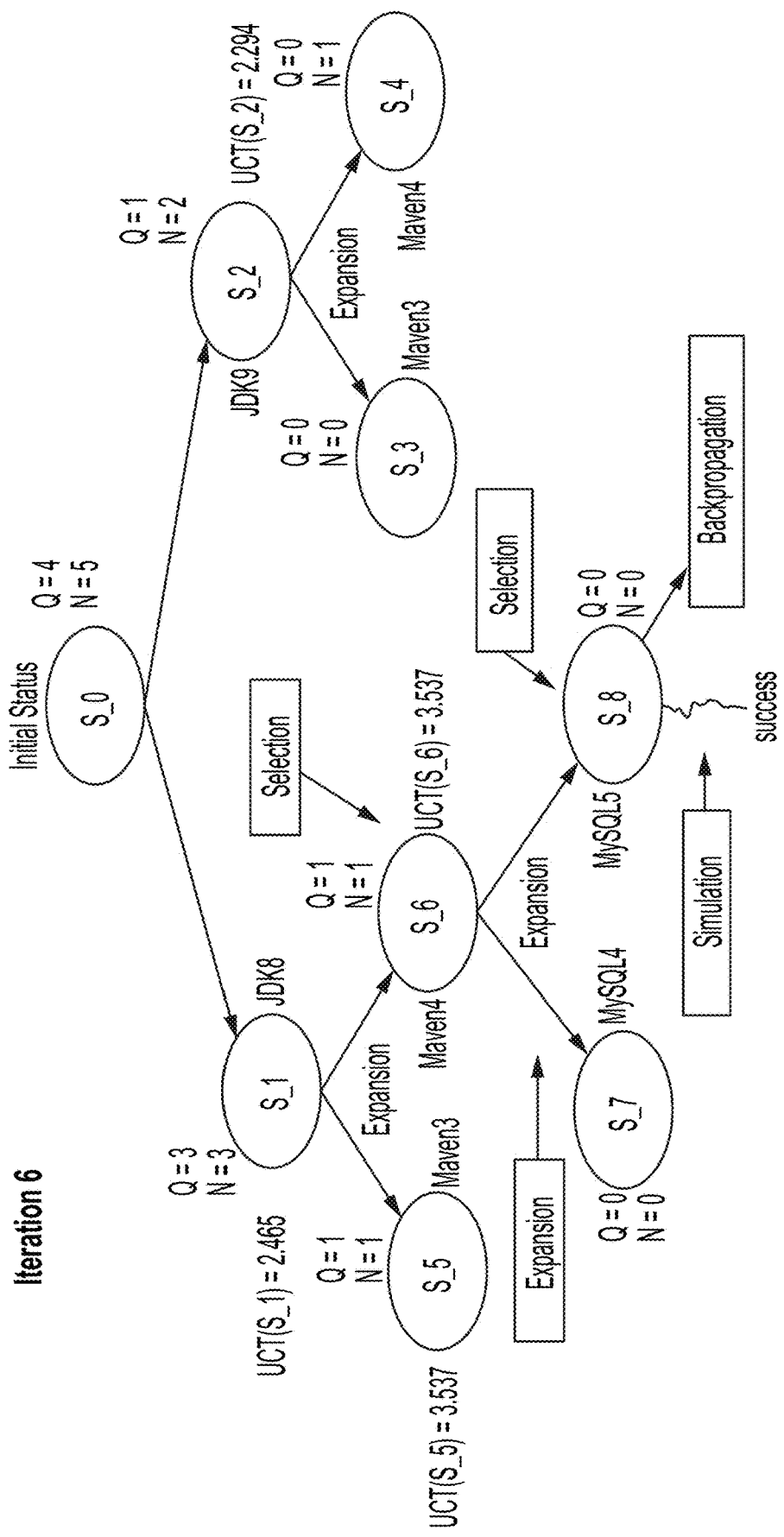

FIG. 11 depicts performance of iteration 6 of the MCTS. The initial status of the nodes at the start of iteration 6 includes the values of Q and N resulting from the backpropagation step performed at the end iteration 5. Iteration 6 starts with root node S_0 as the current node. Since node S_0 is not a leaf node, step 330 randomly selects node S_6 as the next current node because UCT (3.537) for node S_6 equals UCT (3.537) for node S_5. Since current node S_6 is a leaf node and since N≠0 for current node S_6, new level 3 child nodes S_7 and S_8 are generated in expansion step 350 with generic library MySQL assigned to level 3 and library versions MySQL4 and MySQL 5 randomly selected for nodes S_7 and S_8, respectively, with all MySQL library versions that can be randomly selected having equal probability of being randomly selected. Then step 360 randomly selects S_8 as the next current node, with nodes S_7 and S_8 having had equal probability of being randomly selected as the next current node. Then step 370 performs a simulation for current node S_8 with a result status of "FAIL". Then the backpropagation step 380 updates Q and N in the visited path S_8, S_6, S_1, S_0 by incrementing N by 1 (since nodes S_8, S_6, S_1 and S_0 were visited in iteration 6) and incrementing Q by 1 (since the result status was "SUCCESS" in the simulation for node S_8 in iteration 6). The result of the backpropagation in iteration 6 is not shown in FIG. 11 but is shown in the initial status of iteration 7 in FIG. 12.

FIG. 12 depicts the initial status in iteration 7 of the MCTS. The initial status of the nodes at the start of iteration 7 includes the values of Q and N resulting from the backpropagation step performed at the end iteration 6. The execution of iteration 7 is not shown in FIG. 14.

Execution of the MCTS will be performed in iteration 7 and additional iterations until the exit criteria of step 390 is satisfied. Step 390 requires generation of two child nodes in level 3 from each parent node S_5, S_3 and S_4 in level 2 with all nodes in level 3 visited.

There cannot be any level deeper than level 3 (e.g., level 4) in the tree for in this example, because all generic libraries appearing in the Dockerfile, namely JDK, Maven and MySQL already appear in levels 2, 3 and 4, respectively, of the tree. Thus all nodes in level 3 are leaf nodes and will remain as leaf nodes throughout the MCTS.

At the end of iteration 6, the MCTS has generated one successful installation path (namely S_0, S_1, S_6, and S_8) having a simulation result status of "SUCCESS" for a simulation of leaf node S_8 in level 3. As child nodes are added to level 3 from parent nodes S_5, S_3 and S_4 in subsequent iterations, it is possible that one or more additional successful installation path will be generated by the MCTS.

Figure 13:
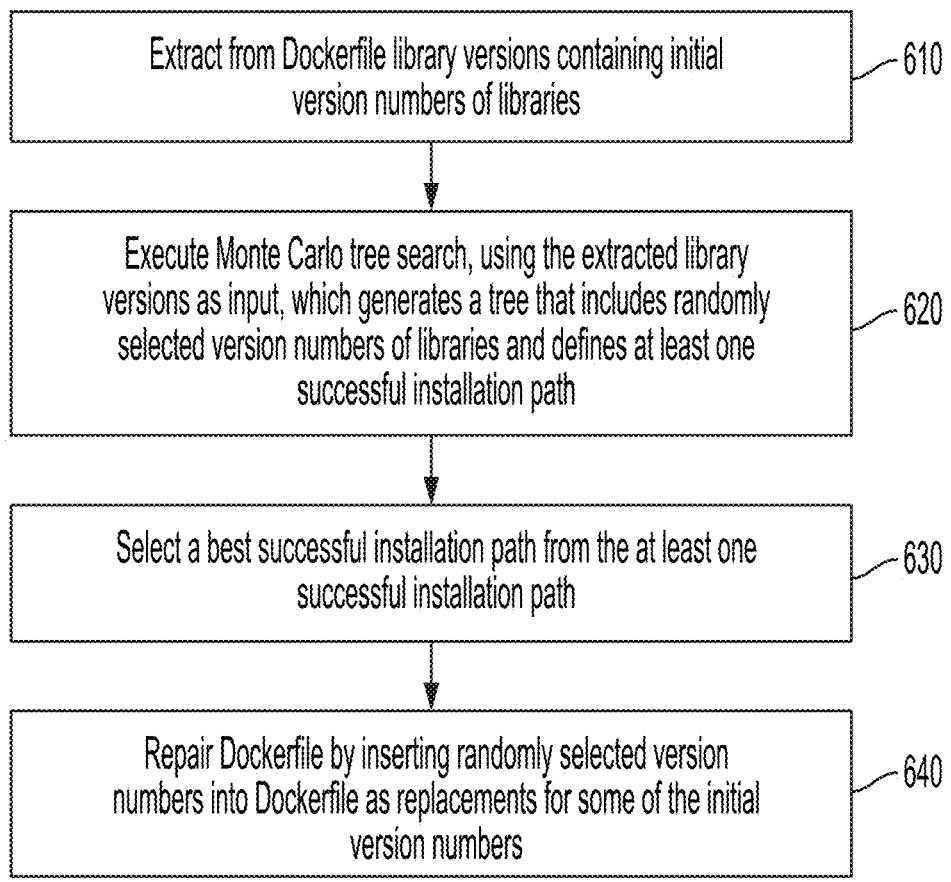
FIG. 13 is a flow chart of a method for repairing a Dockefile, in accordance with embodiments of the present invention.

FIG. 13 is a flow chart of a method for repairing a Dockefile, in accordance with embodiments of the present invention. The chart of FIG. 4 includes steps 610-640.

Step 610 extracts, from the Dockerfile, L library versions denoted as $X_1, X_2, \ldots, X_L$, wherein each library version comprises a generic library name and an associated initial version number, wherein the L library versions appear in a sequential order in the Dockerfile, and wherein L is at least 2.

Step 620 executes, using the extracted L library versions as input, a Monte Carlo tree search (MCTS) of a tree. Executing the MCTS comprises generating the tree comprising L+1 levels denoted as levels 0, 1, 2, . . . , and L, wherein level 0 comprises a root node not associated with any generic library name of the L generic library names, wherein each level of levels 1, 2, L comprises a plurality of nodes, wherein each node in level I is a child node of a node in level I-1 (I=1, 2, . . . , and L), wherein each node in level L is a leaf node, wherein each node in level I represents the generic library name of the library version $X_I$ and an associated randomly selected version number (I=1, 2, . . . , and L), wherein at least one of the randomly selected version numbers associated with at least one node in level I differs from the initial version number associated with version XI in the Dockerfile (I=1, 2, . . . , and L), wherein said executing the MCTS comprises performing K successful simulations of respective leaf nodes in level L which defines K respective successful installation paths of nodes in the tree from the leaf node to each respective leaf node, and wherein K is at least 1.

Step 630 selects a best successful installation path from the K successful installation paths as described supra for step 510f FIG. 5.

Step 640 repairs the Dockerfile, by extracting each randomly selected version number of each node in the best successful installation path and inserting, in the Dockerfile, each extracted randomly selected version number as a replacement, in the Docker file, of respective initial version numbers corresponding to the generic library names that each node in the best successful installation path represents.

In one embodiment, generating the tree comprises generating the nodes in the tree dynamically as the MCTS progresses through successive iterations of an iterative process. In one embodiment, executing the MCTS comprises during one iteration of the successive iterations: generating M child nodes at level J+1 from a parent node at level J of the tree, wherein J is at least 0, and wherein M is at least 2, and wherein each child node of the M child nodes represents the generic library name of the library version $X_{J+1}$; and for each child node of the M child nodes, randomly selecting a version number associated with the generic library name of the library version $X_{J+1}$ from multiple available version number, wherein each available version number has an equal probability of being randomly selected In one embodiment, executing the MCTS comprises during each iteration: setting a current node to the root node while the root node has M child nodes such that M is at least 2; and after said setting the current node to the root node, setting the current node to one child node of the M child nodes based on no other child node of the M child nodes having a higher UCT value than the UCT value of the one child node, wherein the UCT value for any node Vi is a function of: parameters N(Vi) and Q(Vi) for said any node Vi, a parameter N(V) for the root node V, and a specified constant C.

In one embodiment, setting the current node to one child node is based on the one child node having a higher UCT value than the UCT value of every other child node of the M child nodes.

In one embodiment, setting the current node to one child node is based on: (i) the one child node having a same UCT value as the UCT value of an other child node of the M child nodes; and (ii) the one child node having been randomly selected over the other node as the current node, wherein the one child node and the other child node having had an equal probability of being randomly selected as the current node. In one embodiment, the UCT value for said any node Vi is calculated via:

$$UCT(Vi, V) = \frac{Q(Vi)}{N(Vi)} + C\sqrt{\frac{\ln(N(V))}{N(Vi)}}.$$

In one embodiment, during each iteration, executing the MCTS comprises performing a simulation on one leaf node in the tree, and wherein the simulation generates a result status of "SUCCESS: or "FAIL".

In one embodiment, the one leaf node was not previously visited in any backpropagation previously performed.

In one embodiment, the one leaf node on which the simulation was performed during a current iteration was created previously during the current iteration as a child node whose parent node was visited in at least one backpropagation occurring during a previous iteration. In one embodiment, executing the MCTS comprises: during each iteration in which the simulation is performed, performing a backpropagation on a path in the tree from the one leaf node to the root node.

In one embodiment, the simulation comprises generating the result status of "SUCCESS" by performing, by the one or more processors, a process comprising:

installing a library version of a current node into an image in a first installation and determining, from a build log or image status, that the first installation is successful; and scanning the image for vulnerable risk and determining that the scanned image does not show the vulnerable risk; and randomly selecting a next layer library version from available next layer library versions and installing the next layer library version into the image in a second installation and determining, from the build log or image status, that the second installation is successful.

In one embodiment, the simulation comprises generating the result status of "FAIL" by performing, by the one or more processors, a process comprising:

installing a library version of a current node into an image in a first installation and determining, from a build log or image status, that the first installation is not successful; or installing the library version of the current node into the image in the first installation and determining, from the build log or image status, that the first installation is successful, and scanning the image for vulnerable risk and determining that the scanned image shows the vulnerable risk; or installing the library version of the current node into the image in the first installation and determining, from the build log or image status, that the first installation is successful, and scanning the image for vulnerable risk and determining that the scanned image does not show the vulnerable risk, and randomly selecting a next layer library version from available next layer library versions and installing the next layer library version into the image in a second installation and determining, from the build log or image status, that the second installation is not successful In one embodiment, the method further comprises: generating by the one or more processors, a list of libraries, wherein the list of libraries comprise the extracted L library versions sequenced in an order of X1, X2, . . . , XL.

In one embodiment, the method is performed in a virtual clone environment. In one embodiment, the method further comprises: using, by the one or more processors, the repaired Dockerfile to build an image; executing, by the one or more processors, the image to create a container; and launching, by the one or more processors, the container.

Figure 14:
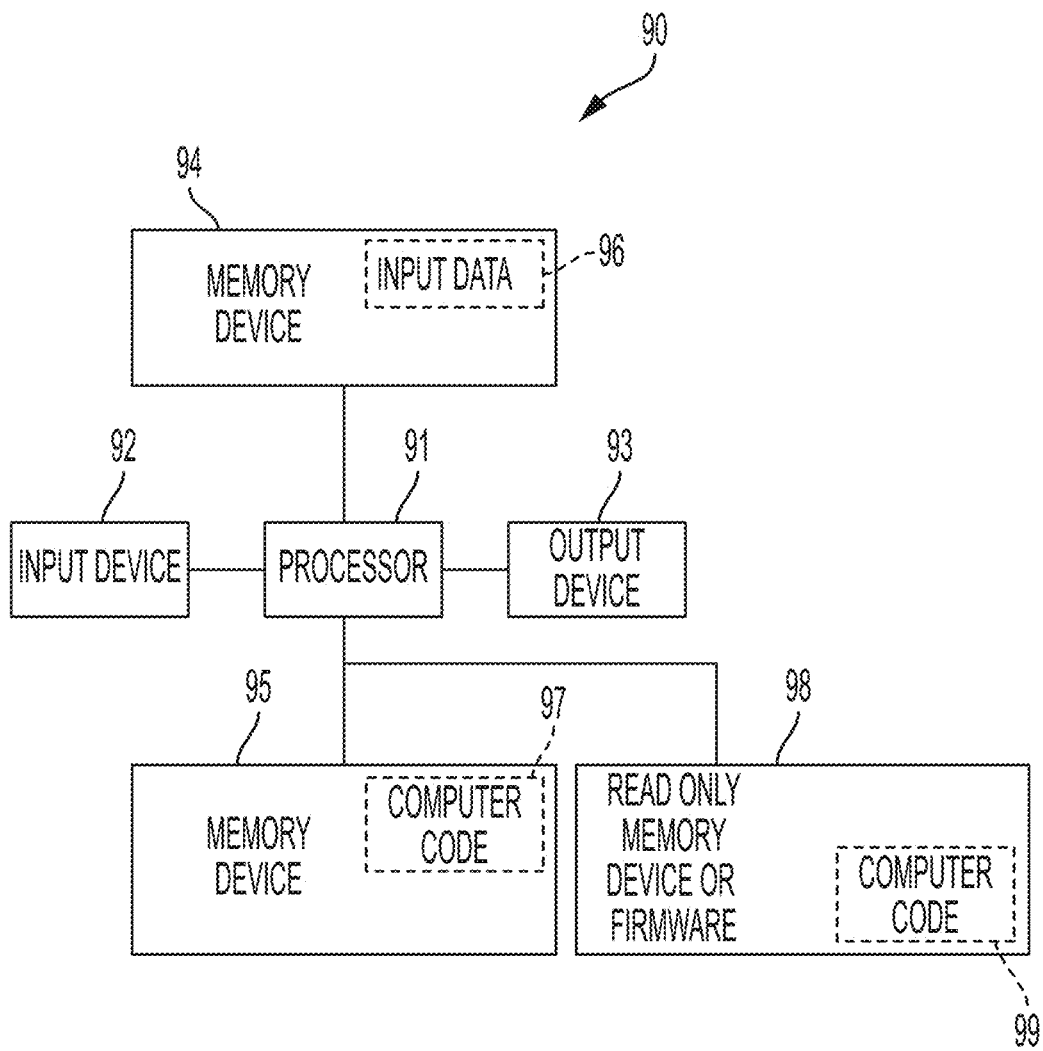
FIG. 14 illustrates a computer system, in accordance with embodiments of the present invention.

FIG. 14 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 14 shows the computer system 90 as a particular configuration of hardware and software, any configuration of hardware and software, as would be known to a person of ordinary skill in the art, may be utilized for the purposes stated supra in conjunction with the particular computer system 90 of FIG. 14. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
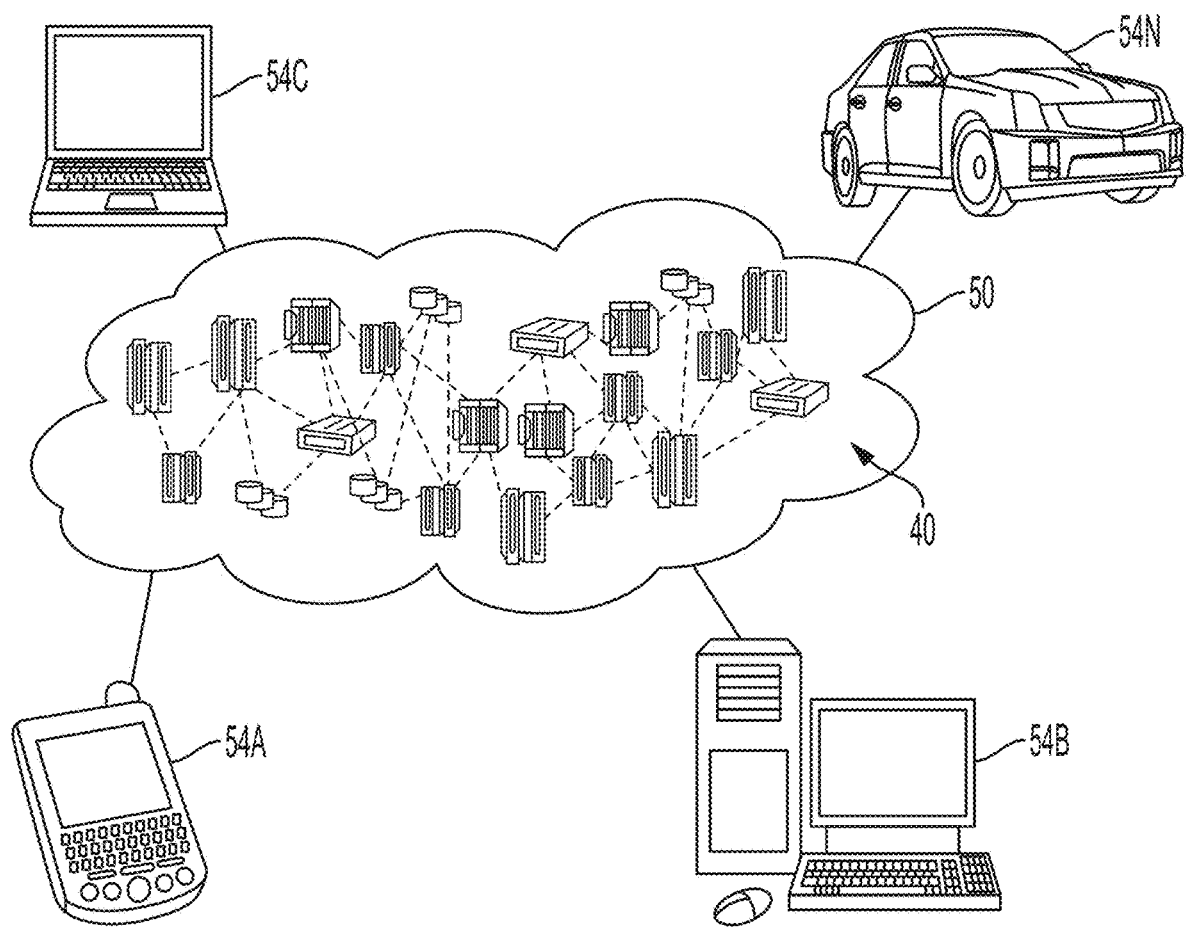
FIG. 15 depicts a cloud computing environment, in accordance with embodiments of the present invention.

Referring now to FIG. 15, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Figure 16:
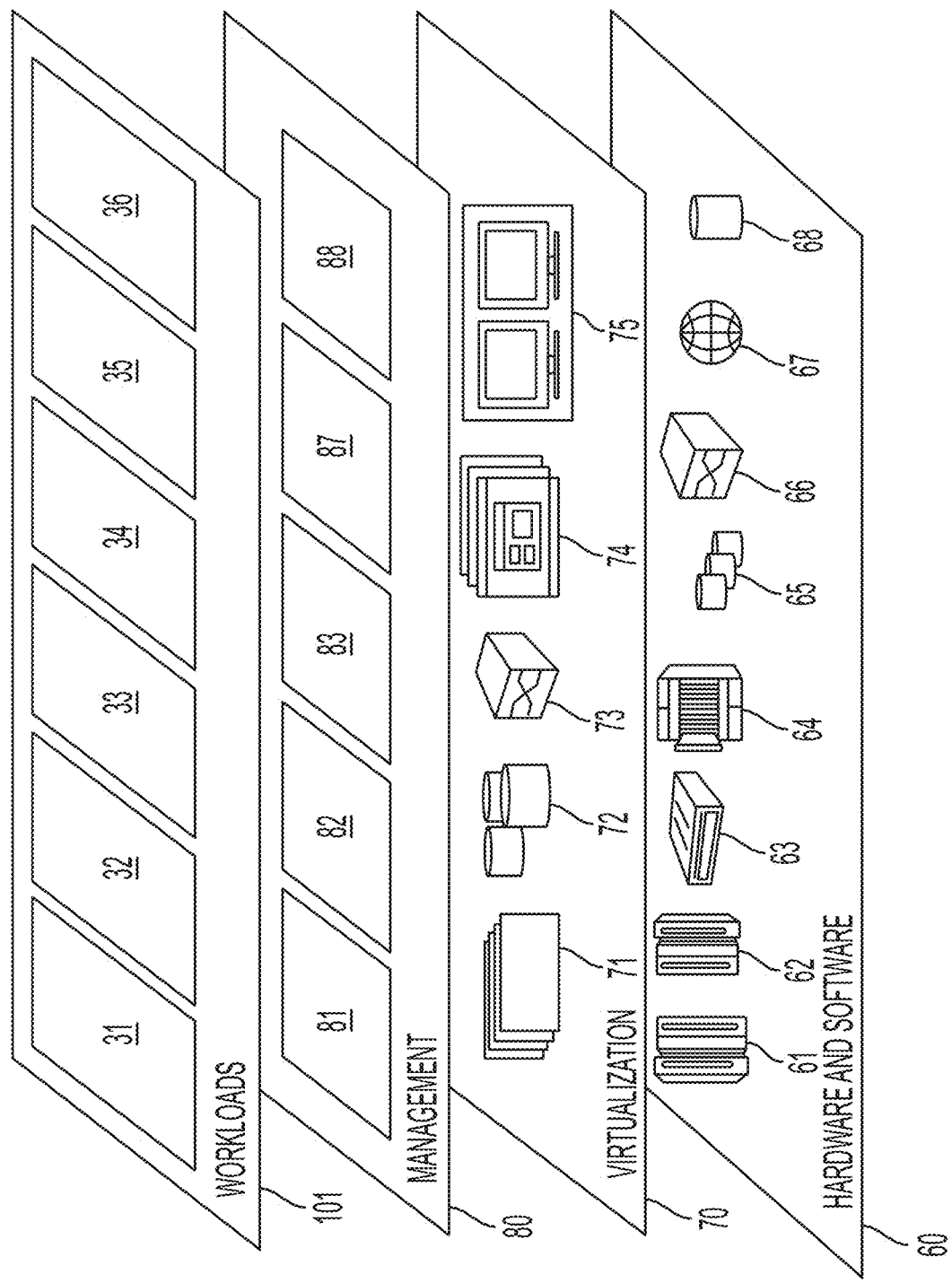
FIG. 16 depicts abstraction model layers, in accordance with embodiments of the present invention.

Referring now to FIG. 16, a set of functional abstraction layers provided by cloud computing environment 50 (FIG. 15) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 30 provides examples of functionality for which the cloud computing environment may be utilized. Examples of workloads and functions which may be provided from this layer include: mapping and navigation 31; software development and lifecycle management 32; virtual classroom education delivery 33; data analytics processing 34; transaction processing 35; and execution of a Monte Carlo Tree Search (MCTS) for updating a Dockerfile 36.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A method for repairing a Dockerfile, said method comprising:

extracting, from the Dockerfile by one or more processors of a computer system, L library versions denoted as $X_1$, $X_2, \ldots, X_L$, wherein each library version comprises a generic library name and an associated recited version number, wherein the L library versions appear in a sequential order in the Dockerfile, and wherein L is at least 2;

executing, by the one or more processors using the extracted L library versions as input, a Monte Carlo tree search (MCTS) of a tree, wherein said executing the MCTS comprises generating the tree comprising L+1 levels denoted as levels 0, 1, 2, . . . , and L, wherein level 0 comprises a root node not associated with any generic library name of the L generic library names, wherein each level of levels 1, 2, . . . , L comprises a plurality of nodes, wherein each node in level I is a child node of a node in level I-1 (I=1, 2, . . . , and L), wherein each node in level L is a leaf node, wherein each node in level I represents the generic library name of the library version XI and an associated randomly selected version number (I=1, 2, . . . , and L), wherein at least one of the randomly selected version numbers associated with at least one node in level I differs from the initial version number associated with version $X_I$ in the Dockerfile (I=1, 2, . . . , and L), wherein said executing the MCTS comprises performing K successful simulations of respective leaf nodes in level L which defines K respective successful installation paths of nodes in the tree from the leaf node to each respective leaf node, and wherein K is at least 1;

selecting, by the one or more processors, a best successful installation path from the K successful installation paths;

repairing, by the one or more processors, the Dockerfile, wherein said repairing the Dockerfile comprises extracting each randomly selected version number of each node in the best successful installation path and inserting, in the Dockerfile, each extracted randomly selected version number as a replacement, in the Docker file, of respective version numbers corresponding to the generic library names that each node in the best successful installation path represents;

using, by the one or more processors, the repaired Dockerfile to build an image;

executing, by the one or more processors, the image to create a container; and launching, by the one or more processors, the container.

2. The method of claim 1, wherein said generating the tree comprises generating the nodes in the tree dynamically as the MCTS progresses through successive iterations of an iterative process.

3. The method of claim 2, wherein said executing the MCTS comprises during one iteration of the successive iterations:

generating M child nodes at level J+1 from a parent node at level J of the tree, wherein J is at least 0, and wherein M is at least 2, and wherein each child node of the M child nodes represents the generic library name of the library version $X_{J+1}$; and for each child node of the M child nodes, randomly selecting a version number associated with the generic library name of the library version $X_{J+1}$ from multiple available version number, wherein each available version number has an equal probability of being randomly selected.

4. The method of claim 2, wherein said executing the MCTS comprises during each iteration:

setting a current node to the root node while the root node has M child nodes such that M is at least 2; and after said setting the current node to the root node, setting the current node to one child node of the M child nodes based on no other child node of the M child nodes having a higher Upper Confidence bound applied to Trees (UCT) value than the UCT value of the one child node, wherein the UCT value for any node Vi is a function of: parameters N(Vi) and Q(Vi) for said any node Vi, a parameter N(V) for the root node V, and a specified constant C, wherein said any node Vi is any node that is in a path in which a backpropagation has occurred.

5. The method of claim 4, wherein said setting the current node to one child node is based on the one child node having a higher UCT value than the UCT value of every other child node of the M child nodes.

6. The method of claim 4, wherein said setting the current node to one child node is based on: (i) the one child node having a same UCT value as the UCT value of an other child node of the M child nodes; and (ii) the one child node having been randomly selected over the other node as the current node, wherein the one child node and the other child node having had an equal porobability of being randomly selected as the current node.

7. The method of claim 4, wherein the UCT value for said any node Vi is calculated via:

$$UCT(Vi, V) = \frac{Q(Vi)}{N(Vi)} + C\sqrt{\frac{\ln(N(V))}{N(Vi)}}.$$

8. The method of claim 2, wherein during each iteration, said executing the MCTS comprises performing a simulation on one leaf node in the tree, and wherein the simulation generates a result status of "SUCCESS: or "FAIL".

9. The method of claim 8, wherein the one leaf node was not previously visited in any backpropagation previously performed.

10. The method of claim 8, wherein the one leaf node on which the simulation was performed during a current iteration was created previously during the current iteration as a child node whose parent node was visited in at least one backpropagation occurring during a previous iteration.

11. The method of claim 8, wherein said executing the MCTS comprises:

during each iteration in which the simulation is performed, performing a backpropagation on a path in the tree from the one leaf node to the root node.

12. The method of claim 8, wherein the simulation comprises generating the result status of "SUCCESS" by performing, by the one or more processors, a process comprising:

installing a library version of a current node into an image in a first installation and determining, from a build log or image status, that the first installation is successful; and scanning the image for vulnerable risk and determining that the scanned image does not show the vulnerable risk; and randomly selecting a next layer library version from available next layer library versions and installing the next layer library version into the image in a second installation and determining, from the build log or image status, that the second installation is successful.

13. The method of claim 8, wherein the simulation comprises generating the result status of "FAIL" by performing, by the one or more processors, a process comprising:
  installing a library version of a current node into an image in a first installation and determining, from a build log or image status, that the first installation is not successful; or
  installing the library version of the current node into the image in the first installation and determining, from the build log or image status, that the first installation is successful, and scanning the image for vulnerable risk and determining that the scanned image shows the vulnerable risk; or
  installing the library version of the current node into the image in the first installation and determining, from the build log or image status, that the first installation is successful, and scanning the image for vulnerable risk and determining that the scanned image does not show the vulnerable risk, and randomly selecting a next layer library version from available next layer library versions and installing the next layer library version into the image in a second installation and determining, from the build log or image status, that the second installation is not successful.

14. The method of claim 1, said method further comprising:
  generating by the one or more processors, a list of libraries, wherein the list of libraries comprise the extracted L library versions sequenced in an order of $X_1, X_2, \ldots, X_L$.

15. The method of claim 1, wherein the method is performed in a virtual clone environment.

16. A computer program product, comprising one or more computer readable hardware storage devices having computer readable program code stored therein, said program code containing instructions executable by one or more processors of a computer system to implement a method for repairing a Dockerfile, said method comprising:
  extracting, from the Dockerfile by the one or more processors, L library versions denoted as $X_1, X_2, \ldots, X_L$, wherein each library version comprises a generic library name and an associated initial version number, wherein the L library versions appear in a sequential order in the Dockerfile, and wherein L is at least 2;
  executing, by the one or more processors using the extracted L library versions as input, a Monte Carlo tree search (MCTS) of a tree, wherein said executing the MCTS comprises generating the tree comprising L+1 levels denoted as levels 0, 1, 2, . . . , and L, wherein level 0 comprises a root node not associated with any generic library name of the L generic library names, wherein each level of levels 1, 2, . . . , L comprises a plurality of nodes, wherein each node in level I is a child node of a node in level I-1 (I=1, 2, . . . , and L), wherein each node in level L is a leaf node, wherein each node in level I represents the generic library name of the library version $X_I$ and an associated randomly selected version number (I=1, 2, . . . , and L), wherein at least one of the randomly selected version numbers associated with at least one node in level I differs from the initial version number associated with version XI in the Dockerfile (I=1, 2, . . . , and L), wherein said executing the MCTS comprises performing K successful simulations of respective leaf nodes in level L which defines K respective successful installation paths of nodes in the tree from the leaf node to each respective leaf node, and wherein K is at least 1;
  selecting, by the one or more processors, a best successful installation path from the K successful installation paths;
  repairing, by the one or more processors, the Dockerfile, wherein said repairing the Dockerfile comprises extracting each randomly selected version number of each node in the best successful installation path and inserting, in the Dockerfile, each extracted randomly selected version number as a replacement, in the Docker file, of respective initial version numbers corresponding to the generic library names that each node in the best successful installation path represents;
  using, by the one or more processors, the repaired Dockerfile to build an image;
  executing, by the one or more processors, the image to create a container; and
  launching, by the one or more processors, the container.

17. The computer program product of claim 16, wherein said generating the tree comprises generating the nodes in the tree dynamically as the MCTS progresses through successive iterations of an iterative process.

18. A computer system, comprising one or more processors, one or more memories, and one or more computer readable hardware storage devices, said one or more hardware storage devices containing program code executable by the one or more processors via the one or more memories to implement a method for repairing a Dockerfile, said method comprising:
  extracting, from the Dockerfile by the one or more processors, L library versions denoted as $X_1, X_2, \ldots, X_L$, wherein each library version comprises a generic library name and an associated initial version number, wherein the L library versions appear in a sequential order in the Dockerfile, and wherein L is at least 2;
  executing, by the one or more processors using the extracted L library versions as input, a Monte Carlo tree search (MCTS) of a tree, wherein said executing the MCTS comprises generating the tree comprising L+1 levels denoted as levels 0, 1, 2, . . . , and L, wherein level 0 comprises a root node not associated with any generic library name of the L generic library names, wherein each level of levels 1, 2, . . . , L comprises a plurality of nodes, wherein each node in level I is a child node of a node in level I-1 (I=1, 2, . . . , and L), wherein each node in level L is a leaf node, wherein each node in level I represents the generic library name of the library version $X_I$ and an associated randomly selected version number (I=1, 2, . . . , and L), wherein at least one of the randomly selected version numbers associated with at least one node in level I differs from the initial version number associated with version $X_I$ in the Dockerfile (I=1, 2, . . . , and L), wherein said executing the MCTS comprises performing K successful simulations of respective leaf nodes in level L which defines K respective successful installation paths of nodes in the tree from the leaf node to each respective leaf node, and wherein K is at least 1;
  selecting, by the one or more processors, a best successful installation path from the K successful installation paths;
  repairing, by the one or more processors, the Dockerfile, wherein said repairing the Dockerfile comprises extracting each randomly selected version number of each node in the best successful installation path and inserting, in the Dockerfile, each extracted randomly selected version number as a replacement, in the Docker file, of respective initial version numbers corresponding to the generic library names that each node in the best successful installation path represents;

using, by the one or more processors, the repaired Dockerfile to build an image;

executing, by the one or more processors, the image to create a container; and launching, by the one or more processors, the container.

19. The computer system of claim 18, wherein said generating the tree comprises generating the nodes in the tree dynamically as the MCTS progresses through successive iterations of an iterative process.

* * * * *